United States Patent [19]
Rowland

[11] 3,778,964
[45] Dec. 18, 1973

[54] APPARATUS FOR SHRINK PACKAGING

[75] Inventor: Frederick F. Rowland, Ferguson, Mo.

[73] Assignee: Roll-O-Sheets, Incorporated, St. Louis, Mo.

[22] Filed: Nov. 15, 1971

[21] Appl. No.: 198,642

[52] U.S. Cl. .................................. 53/184, 219/388
[51] Int. Cl. .............................................. B65b 53/02
[58] Field of Search ................... 53/30, 184, 373, 53/379; 34/4, 39, 201; 219/354, 358, 388; 263/8

[56] References Cited
UNITED STATES PATENTS

| | | | |
|---|---|---|---|
| 3,577,866 | 5/1971 | Ehrenfried | 53/184 |
| 3,591,767 | 7/1971 | Mudie | 219/388 X |
| 3,101,898 | 8/1963 | Mader | 263/8 R |
| 3,349,502 | 10/1967 | Kiefer | 53/184 X |
| 3,378,989 | 4/1968 | Denker | 53/184 |
| 2,156,845 | 5/1939 | Gentele | 219/354 |

*Primary Examiner*—Robert L. Spruill
*Attorney*—Irving Powers et al.

[57] ABSTRACT

Apparatus for shrink-packaging articles in a heat-sealable, heat-shrinkable plastic film wrapper, in which the wrapper is heated for heat-sealing by means located below the article as it is conveyed through the apparatus, this heat-sealing means being heated by thermal radiation from thermal radiation heaters within the apparatus, and in which the wrapper is heated for heat-shrinking by thermal radiation from these heaters and by air heated by the heaters.

3 Claims, 5 Drawing Figures

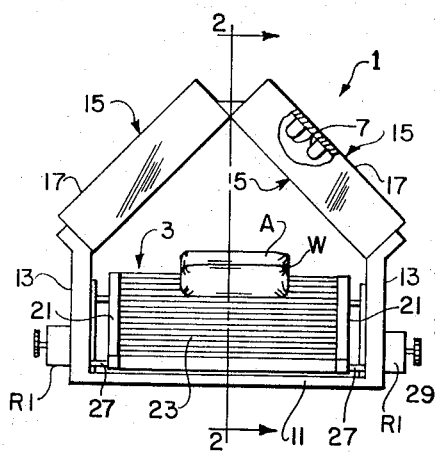
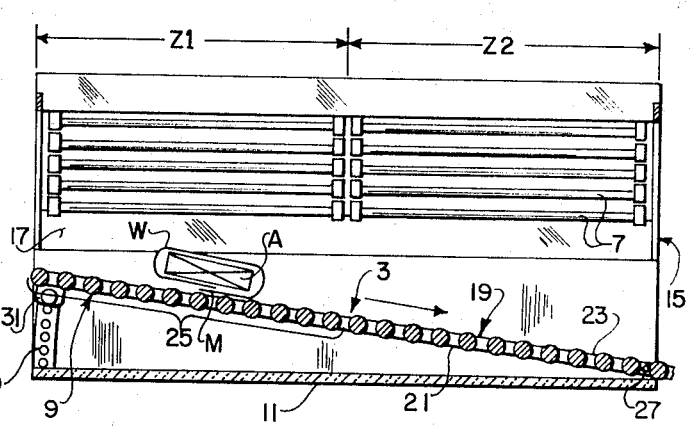
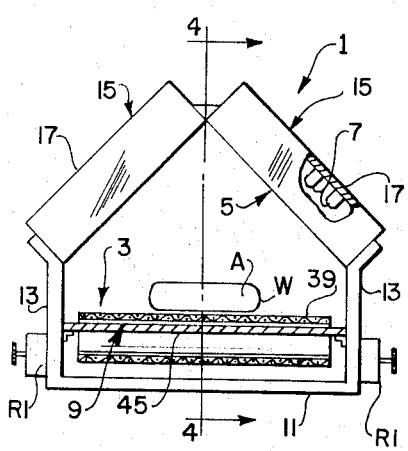
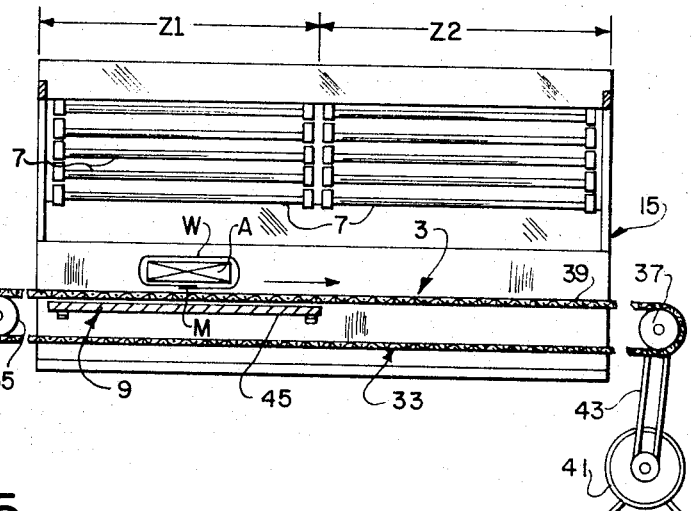
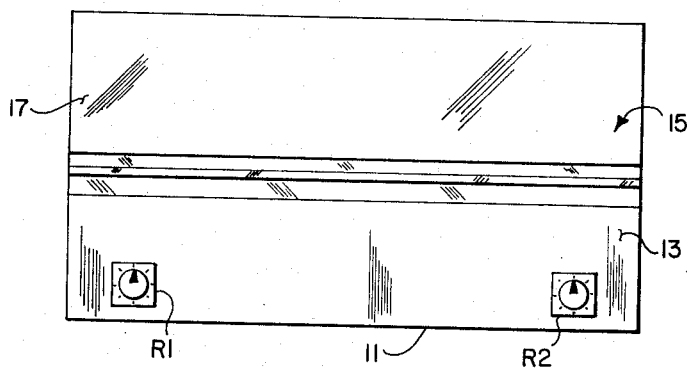

APPARATUS FOR SHRINK PACKAGING

BACKGROUND OF THE INVENTION

This invention relates to packaging apparatus, and more particularly to apparatus for packaging articles in heat-sealable heat-shrinkable plastic film.

The invention is generally in the same field as U.S. Pat. No. 3,357,153 relating to a shrink tunnel for heat-shrinking film, including a conveyor belt for transporting an article (or articles) wrapped in a sheet of film through the tunnel, wherein the film is heated by hot air. This patent refers to the placement of the enwrapped product on the conveyor with the overlapped or bunched portions of the film beneath the product resting on the conveyor. A problem which has existed with this type of tunnel and mode of operation has been that of attaining effective heat-sealing of the overlapped bottom portions of the film. Generally, the heat-sealing has been effected as an operation entirely separate from and in advance of the transport of the enwrapped article through the tunnel.

SUMMARY OF THE INVENTION

Among the several objects of this invention may be noted the provision of packaging apparatus of the class described adapted for effective heat-sealing of the overlapped or bunched bottom portions of a heat-sealable heat-shrinkable plastic film wrapper for an article or articles as well as heating of the film as the enwrapped article or articles (the "work") is transported through the tunnel, without any preliminary heat-sealing of the bunched bottom portions; the provision of such apparatus in which the enwrapped articles are transported by gravity through the tunnel; and the provision of such apparatus which is of simple and economical construction.

In general, packaging apparatus of this invention for packaging one or more articles constituting the work to be packaged in heat-sealable, heat-shrinkable plastic film comprises means for conveying an item of work along a predetermined path with the work enwrapped in heat-sealable, heat-shrinkable plastic film and with the margins of the film overlapping one another at the bottom of the work for being heat-sealed together. Means is provided which is adapted to be heated by thermal radiation located for passage thereover of the work as it travels along the path for heating the margins of the film to heat-seal them together, thermal radiation means being provided for emitting thermal radiation for heating the heat-sealing means to a temperature sufficient to effect heat-sealing of the margins of the film as the work passes over the heat-sealing means.

Other objects and features will be in part apparent and in part pointed out hereinafter.

BRIEF DESCRIPTION OF THE DRAWINGS

FIG. 1 is an end elevation of packaging apparatus of this invention having a roller conveyor, and showing an enwrapped article being conveyed therethrough on the conveyor;

FIG. 2 is a vertical longitudinal section of the FIG. 1 apparatus on line 2—2 of FIG. 1;

FIG. 3 is an end elevation of a second embodiment of packaging apparatus of this invention having an endless belt conveyor and showing an enwrapped article being conveyed through the apparatus on the belt conveyor;

FIG. 4 is a vertical longitudinal section of the FIG. 3 apparatus on line 4—4 of FIG. 3; and FIG. 5 is a side elevation of the apparatus.

Corresponding reference characters indicate corresponding parts throughout the several views of the drawings.

DESCRIPTION OF THE PREFERRED EMBODIMENTS

Referring to the drawings, there is indicated at A an article of box-like form constituting the work to be packaged. The article is enwrapped in a sheet of heat-sealable, heat-shrinkable plastic film, such as a heat-shrinkable polyethylene film, constituting a wrapper W. The film is wrapped about the top, sides and ends of the article, and the margins M of the wrapper are folded under the article to overlap one another. Although article A is shown to have a box-like form, it will be understood that articles of various other shapes may be packaged by means of the apparatus of this invention.

Apparatus of this invention, indicated in its entirety at 1, is shown to comprise conveyor means generally indicated at 3 for moving an item of work enwrapped in wrapper W along a predetermined path through the apparatus from one end thereof constituting its entrance end (its left end as shown in FIGS. 2 and 4) to its other end constituting its exit end. The conveyor means extends through and is enclosed by a tunnel generally indicated at 5. Infrared heating elements indicated at 7 (e.g., infrared lamps or other infrared radiators) for emitting thermal radiation are mounted in the tunnel. Means, generally indicated at 9, adapted to be heated by thermal radiation from heaters 7 is located in the tunnel for passage thereover of the enwrapped work as it travels along the conveyor means for heating the margins M of the wrapper and heat-sealing them together. The top, sides and ends of the wrapper on the work are heated by means of thermal radiation from heaters 7, and by means of air within the tunnel which has been heated by the heaters for heat-shrinking the wrapper about the article to form a tight overwrap about the article.

Tunnel 5 includes a floor 11 and side walls 13 extending upwardly therefrom, these walls extending the length of the tunnel. The roof of the tunnel is formed by a pair of heating element banks, each bank being indicated at 15 and extending the length of the tunnel. Each bank 15 is mounted on the upper edge of the respective side wall 13 and extends upwardly and inwardly to meet with the other bank along the longitudinal center plane of the apparatus. Each bank 15 includes a reflector 17 formed of sheet metal or the like for reflecting thermal radiation emitted from the heaters 7 toward the bottom of the tunnel. The heating elements in each bank 15 are divided into two zones as indicated at Z1 and Z2, with zone Z1 being adjacent the entrance end of the tunnel and with zone Z2 being adjacent the exit end of the tunnel. The power supplied to the heating elements in the two zones Z1 and Z2 in each bank is controlled by rheostats R1 and R2, respectively, mounted on a side wall 13. By controlling the power supplied to the heaters in each zone, the thermal radiation emitted from the heaters in each zone may be selectively varied.

As shown in FIGS. 1 and 2, conveyor means 3 is a roller conveyor generally indicated at 19 having a pair of side rails 21 extending lengthwise through tunnel 5 with a plurality of rollers 23 extending transversely of the tunnel between the side rails. Each roller is journalled in ball bearings (not shown) carried by the side rails for rotation about its axis for conveying articles A through the tunnel. The rollers adjacent the entrance end of the tunnel beneath zone Z1 constitute heat-sealing means 9 and are indicated at 25 to distinguish them from the other rollers 23. Sealing rollers 25 have a relatively high thermal radiation absorptivity factor for absorbing thermal radiation from heaters 7 to heat the sealing rollers to a temperature sufficient to heat-seal together the margins M of the wrapper as the article travels over and bears against the sealing rollers 25. Preferably, all the rollers 23 and 25 are made of aluminum with sealing rollers 25 colored black, as by being painted black, to have a relatively high thermal radiation absorptivity factor, and with the other rollers of the roller conveyor being colored white (or being left uncolored) to have a lower absorptivity factor than the sealing rollers.

With rheostats R1 and R2 of each bank 15 adjusted so that zones Z1 emit more thermal radiation than zones Z2, the black sealing rollers 25 beneath zones Z1 are heated to a higher temperature than the white rollers beneath zones Z2 so that heatsealing of the margins M occurs only as the article travels over the sealing rollers 25 and so that no further heat-sealing of the margins M occurs as the work travels over the white rollers.

Roller conveyor 19 is inclined from the horizontal with its entrance end at a higher elevation than its exit end for gravity feed of the enwrapped articles A through the apparatus. As shown in FIG. 1, roller conveyor 19 is pivotally mounted on side walls 13 by pins 27 at the exit end of the roller conveyor. The inclination of the roller conveyor may be varied to change the speed at which articles slide down the roller conveyor by pivoting the conveyor about pins 27. The conveyor may be positioned in any one of a plurality of fixed inclined positions as determined by a set of holes 29 in each side wall 13 adjacent the entrance end of the tunnel, each hole being adapted to receive locating pin 31 for supporting the roller conveyor at its entrance end in various inclined positions.

In operation, an article A enwrapped in wrapper W is placed on the entrance end of the roller conveyor 19 for being conveyed through tunnel 5. As the article rolls down over the heat-sealing rollers 25, the bottom of the wrapper which is in contact with these sealing rollers is heated to a temperature sufficient for the heat-sealing together of the overlapping margins M of the wrapper on the bottom of the article. Also, as the article passes through the tunnel, the wrapper is heated to a temperature sufficient to effect heat-shrinking of the wrapper about the article by thermal radiation from the heaters 7 and by air within the tunnel which has been heated by the heaters. Rheostats R1 and R2 are adjusted so that the heating elements 7 in zone Z1 of each bank 15 emit a greater amount of thermal radiation than the heating elements in the zones Z2 for heat-sealing rollers 25 to a high enough temperature to effect heat-sealing of the margins of the wrapper as the article passes thereover.

In a second embodiment of the packaging apparatus 1 of this invention shown in FIGS. 3 and 4, conveyor means 3 is an endless conveyor belt 33 which is trained around roller means 35 at the entrance end of tunnel 5 and around roller means 37 at the exit end of the tunnel. Conveyor belt 33 is of open construction (e.g., a woven wire mesh belt) for permitting thermal radiation from the heaters 7 to pass therethrough for heating sealing means 9. The conveyor belt has an upper reach 39 on which articles A are placed, this upper reach being driven by means of a motor 41 and belt and pulley drive 43 for conveying the articles placed thereon through the apparatus from left to right (as indicated by the arrow in FIG. 4).

Heat-sealing means 9 in FIGS. 3 and 4 is constituted by a heat-sealing plate 45 located below upper reach 39, the sealing plate extending transversely of tunnel 5 below the upper reach 39 of the belt secured to side walls 13 adjacent the entrance end of the tunnel. The upper surface of sealing plate 45 is black and thereby has a relatively high thermal radiation absorptivity factor so that it may be readily heated by thermal radiation from heaters 7 passing through the open construction of upper reach 39. Sealing plate 45 is positioned immediately adjacent the bottom face of upper reach 39 so that air heated by the plate and thermal radiation emitted by the plate cooperate to heat the margins M of wrapper W to a temperature sufficient to heat-seal the margins together as the work is conveyed over the sealing plate.

In operation, an article A enwrapped in a wrapper W as heretofore described is placed on the entrance end of upper reach 39 of conveyor belt 33 for movement through tunnel 5. As the article passes over sealing plate 45, the bottom portions of the wrapper are heated to a temperature sufficient for heat-sealing together the overlapping margins M of the wrapper. The portions of the wrapper adjacent the top, sides and ends of the article are heated by thermal radiation from heaters 7 and by the air within the tunnel to a temperature sufficient to effect heat-shrinking of the wrapper about the article.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for packaging articles constituting the work to be packaged in heat-sealable, heat-shrinkable plastic film, comprising a tunnel means for conveying an item of work along a predetermined path through the tunnel with the work enwrapped in heat-sealable, heat-shrinkable plastic film and with the margins of the film overlapping one another at the bottom of the work for being heat-sealed together, said conveying means comprising a roller conveyor having a series of rollers inclined to the horizontal with one end constituting its entrance end at one end of the tunnel at a higher elevation than its other end constituting its exit end for gravity feed of the work through the tunnel, thermal radiation heating means mounted within the tunnel for directing thermal radiation toward the roller conveyor and hence toward work travelling on the conveyor through the tunnel for heating the film wrapped around the work as the work travels through the tunnel, at least one roller of said conveyor adjacent its entrance end constituting a heat-sealing roller for heating the said margins of the film on the bottom of an item of work as it travels over said heat-sealing roller to heat-seal the said margins of the film, said heat-sealing roller being blackened for being heated to sealing temperature by absorption of thermal radiation from said thermal radiation heating means, other rollers of said conveyor being unblackened and having a lower thermal radiation absorptivity factor than said heat-sealing roller.

2. Apparatus as set forth in claim 1 wherein said conveyor has a series of said blackened heat-sealing rollers in a first zone adjacent the entrance end followed by a series of unblackened rollers in a second zone adjacent the exit end of the tunnel.

3. Apparatus as set forth in claim 2 having separate thermal radiation heating means for each of said zones, and means for selectively controlling the heating means in each zone.

* * * * *